United States Patent
Pettersson et al.

(10) Patent No.: US 9,527,504 B2
(45) Date of Patent: *Dec. 27, 2016

(54) METHOD FOR DRIVING A HYBRID VEHICLE IN CONNECTION WITH START OF THE COMBUSTION ENGINE OF THE VEHICLE

(71) Applicant: Scania CV AB, Södertälje (SE)

(72) Inventors: Niklas Pettersson, Stockholm (SE); Mikael Bergquist, Huddinge (SE); Johan Lindström, Nyköping (SE); Anders Kjell, Ekerö (SE); Mathias Björkman, Tullinge (SE)

(73) Assignee: SCANIA CV AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/410,591

(22) PCT Filed: Jun. 26, 2013

(86) PCT No.: PCT/SE2013/050792
§ 371 (c)(1),
(2) Date: Dec. 23, 2014

(87) PCT Pub. No.: WO2014/003672
PCT Pub. Date: Jan. 3, 2014

(65) Prior Publication Data
US 2015/0142239 A1 May 21, 2015

(30) Foreign Application Priority Data

Jun. 27, 2012 (SE) .................................. 1250715-8
Jun. 25, 2013 (SE) .................................. 1350768-6

(51) Int. Cl.
*B60W 20/00* (2016.01)
*B60W 10/08* (2006.01)
(Continued)

(52) U.S. Cl.
CPC .............. *B60W 20/40* (2013.01); *B60K 6/365* (2013.01); *B60K 6/48* (2013.01); *B60W 10/02* (2013.01);
(Continued)

(58) Field of Classification Search
CPC ......... B60K 6/365; B60K 6/48; Y10T 477/24; Y10T 10/6221; Y10T 10/6286; B60W 10/02; B60W 10/06; B60W 10/08; B60W 10/11; B60W 10/115; B60W 10/184; B60W 10/196; B60W 20/00; B60W 20/40; F02N 5/04; F02N 11/0851; F02N 15/003; F02N 15/046; B60Y 2300/49; Y10S 903/93; Y02T 10/6221; Y02T 10/6286
(Continued)

(56) References Cited

U.S. PATENT DOCUMENTS

| 5,713,814 A | 2/1998 | Hara et al. ........................ 477/5 |
| 5,735,770 A | 4/1998 | Omote et al. ..................... 477/5 |

(Continued)

FOREIGN PATENT DOCUMENTS

| DE | 199 03 936 A1 | 5/2000 |
| DE | 10 2005 040 153 A1 | 3/2007 |

(Continued)

OTHER PUBLICATIONS

International Search Report mailed Oct. 21, 2013 in corresponding PCT International Application No. PCT/SE2013/050792.
(Continued)

*Primary Examiner* — Atul Trivedi
(74) *Attorney, Agent, or Firm* — Ostrolenk Faber LLP

(57) ABSTRACT

A method for driving a hybrid vehicle with a propulsion system including a combustion engine, an electric machine with a rotor and a stator and a planetary gear with three
(Continued)

components including a sun gear, a ring gear and a planet wheel carrier, where an output shaft of the combustion engine is connected to a first component, an input shaft of a gearbox is connected to a second component and the rotor of the electric machine is connected to a third component. The vehicle is driven forward by the electric machine. The reverse gear engaged in the gearbox drives the third component of the planetary gear to rotate with a negative rotational speed while a brake brakes the first component. Thereafter, move the component brake to an open position, so that the output shaft of the combustion engine rotates with a positive rotational speed so that the combustion engine may be started.

11 Claims, 3 Drawing Sheets

(51) Int. Cl.
*B60W 10/02* (2006.01)
*B60W 10/196* (2012.01)
*B60W 10/184* (2012.01)
*B60W 10/06* (2006.01)
*B60W 10/115* (2012.01)
*B60K 6/365* (2007.10)
*B60K 6/48* (2007.10)
*B60W 10/11* (2012.01)
*F02N 5/04* (2006.01)
*F02N 11/08* (2006.01)
*F02N 15/00* (2006.01)
*F02N 15/04* (2006.01)

(52) U.S. Cl.
CPC .............. *B60W 10/06* (2013.01); *B60W 10/08* (2013.01); *B60W 10/11* (2013.01); *B60W 10/115* (2013.01); *B60W 10/184* (2013.01); *B60W 10/196* (2013.01); *B60W 20/00* (2013.01); *F02N 5/04* (2013.01); *F02N 11/0851* (2013.01); *F02N 15/003* (2013.01); *F02N 15/046* (2013.01); *B60Y 2300/49* (2013.01); *Y02T 10/6221* (2013.01); *Y02T 10/6286* (2013.01); *Y10S 903/93* (2013.01); *Y10T 477/24* (2015.01)

(58) Field of Classification Search
USPC ............ 701/22; 180/65.265; 477/4; 903/930
See application file for complete search history.

(56) References Cited

U.S. PATENT DOCUMENTS

| | | | |
|---|---|---|---|
| 5,895,333 A | 4/1999 | Morisawa | 475/5 |
| 6,336,889 B1 | 1/2002 | Oba et al. | 477/5 |
| 6,354,974 B1 | 3/2002 | Kozarekar | 475/5 |
| 6,558,283 B1 | 5/2003 | Schnelle | 475/5 |
| 8,292,770 B2 | 10/2012 | Novikov | 475/150 |
| 8,500,589 B2* | 8/2013 | Ortmann | B60K 6/387 475/152 |
| 9,005,078 B2* | 4/2015 | Hayashi | B60K 6/365 477/5 |
| 2003/0166429 A1 | 9/2003 | Tumback | 475/5 |
| 2004/0168841 A1 | 9/2004 | Ohta | 180/65.25 |
| 2004/0255904 A1 | 12/2004 | Izawa | 123/352 |
| 2005/0148423 A1* | 7/2005 | Miller | B62M 9/08 475/217 |
| 2005/0209760 A1 | 9/2005 | Tabata | 701/53 |
| 2006/0166773 A1* | 7/2006 | Raghavan | B60K 6/365 475/5 |
| 2007/0129862 A1* | 6/2007 | Kim | B60K 6/445 701/36 |
| 2007/0293362 A1* | 12/2007 | Kamada | B60K 6/365 475/5 |
| 2008/0045366 A1* | 2/2008 | Schondorf | B60K 6/365 475/5 |
| 2008/0076623 A1 | 3/2008 | Tabata | 477/5 |
| 2008/0078591 A1* | 4/2008 | Schondorf | B60K 6/365 180/65.235 |
| 2008/0149067 A1* | 6/2008 | Kimes | B60K 6/12 123/245 |
| 2008/0188348 A1 | 8/2008 | Kumazaki et al. | 477/35 |
| 2008/0258474 A1* | 10/2008 | Tabata | B60K 6/365 290/40 A |
| 2009/0036263 A1* | 2/2009 | Iwase | B60K 6/445 477/3 |
| 2009/0055061 A1* | 2/2009 | Zhu | B60K 6/48 701/55 |
| 2009/0093331 A1* | 4/2009 | Iwanaka | B60K 6/365 475/5 |
| 2009/0149290 A1 | 6/2009 | Wallner et al. | 475/149 |
| 2009/0223727 A1* | 9/2009 | Tolksdorf | B60K 6/365 180/65.26 |
| 2009/0227407 A1* | 9/2009 | Kamada | B60K 6/445 475/5 |
| 2009/0250280 A1* | 10/2009 | Abe | B60K 6/26 180/65.285 |
| 2010/0012405 A1* | 1/2010 | Katsuta | B60K 6/387 180/65.22 |
| 2010/0044128 A1 | 2/2010 | Oba | 180/65.25 |
| 2010/0048338 A1 | 2/2010 | Si | 475/5 |
| 2010/0051360 A1 | 3/2010 | Oba | 180/65.22 |
| 2010/0071974 A1* | 3/2010 | Akutsu | B60K 6/26 180/65.265 |
| 2010/0078238 A1* | 4/2010 | Oba | B60K 6/40 180/65.225 |
| 2010/0113213 A1* | 5/2010 | Oba | B60K 6/445 477/5 |
| 2010/0116615 A1 | 5/2010 | Oba | 192/84.3 |
| 2010/0120579 A1 | 5/2010 | Kawasaki | 477/3 |
| 2010/0125019 A1* | 5/2010 | Tabata | B60K 6/365 477/3 |
| 2010/0125020 A1 | 5/2010 | Ikegami | 477/3 |
| 2010/0138086 A1* | 6/2010 | Imamura | B60K 6/445 701/22 |
| 2010/0151988 A1* | 6/2010 | Tabata | B60K 6/442 477/3 |
| 2010/0173746 A1 | 7/2010 | Ideshio et al. | 477/36 |
| 2011/0010063 A1 | 1/2011 | Ota | 710/58 |
| 2011/0144874 A1* | 6/2011 | Kirchner | F16D 67/04 701/67 |
| 2012/0059542 A1 | 3/2012 | Kawai et al. | 701/22 |
| 2012/0065017 A1 | 3/2012 | Yamada | 475/5 |
| 2012/0116624 A1* | 5/2012 | Reith | B60K 6/48 701/22 |
| 2012/0143426 A1* | 6/2012 | Yamamoto | B60K 6/52 701/22 |
| 2012/0197475 A1* | 8/2012 | Akutsu | B60K 6/26 701/22 |
| 2012/0203414 A1* | 8/2012 | Akutsu | B60K 6/26 701/22 |
| 2012/0203415 A1* | 8/2012 | Akutsu | B60K 6/26 701/22 |
| 2015/0005125 A1* | 1/2015 | Hayashi | B60K 6/365 475/2 |
| 2015/0051770 A1* | 2/2015 | Hayashi | B60K 6/445 701/22 |
| 2015/0051773 A1* | 2/2015 | Hayashi | B60W 10/08 701/22 |
| 2015/0087457 A1* | 3/2015 | Hayashi | B60K 6/365 475/2 |

FOREIGN PATENT DOCUMENTS

| | | |
|---|---|---|
| DE | 10 2006 054 405 A1 | 6/2008 |
| DE | 10 2007 004 463 | 8/2008 |
| DE | 10 2007 042 949 A1 | 4/2009 |
| EP | 1 319 546 A1 | 6/2003 |

(56) References Cited

FOREIGN PATENT DOCUMENTS

| JP | 2003-319508 | 11/2003 |
|----|-------------|---------|
| WO | WO 2006/079909 | 8/2006 |
| WO | WO 2014/087210 | 6/2014 |

OTHER PUBLICATIONS

International Search Report dated Oct. 18, 2013 issued in PCT International Application No. PCT/SE2013/050789.
International Search Report dated Oct. 24, 2013 issued in PCT International Application No. PCT/SE2013/050793.

* cited by examiner

METHOD FOR DRIVING A HYBRID VEHICLE IN CONNECTION WITH START OF THE COMBUSTION ENGINE OF THE VEHICLE

CROSS-REFERENCE TO RELATED APPLICATIONS

The present application is a 35 U.S.C. §§371 National Phase conversion of PCT/SE2013/050792, filed Jun. 26, 2013, which claims priority of Swedish Patent Application No. 1250715-8, filed Jun. 27, 2012 the contents of which are incorporated by reference herein and Swedish Patent Application No. 1350768-6, filed Jun. 25, 2013 the contents of which are incorporated by reference herein. The PCT International Applications were published in the English language.

FIELD OF THE INVENTION AND PRIOR ART

The present invention relates to a method for driving a vehicle in connection with the start of a combustion engine in a propulsion system of the vehicle.

The invention is especially, but not exclusively, directed to carrying out such a method for motor vehicles in the form of wheeled utility vehicles, especially heavy vehicles, such as trucks and buses.

The inventive method relates to driving of a so-called hybrid vehicle in connection with the start of a combustion engine in a propulsion system of this vehicle. A hybrid vehicle is generally a vehicle which may be driven by a primary engine, here a combustion engine, and a secondary engine, here an electric machine. The electric machine is preferably provided with at least one hybrid energy storing means, for example, a battery or a capacitor, for storing electric energy and regulating equipment for regulating the flow of electric energy between the energy storing means and the electric machine. The electric machine may alternately operate as a motor and a generator depending on the state of operation of the vehicle. When a brake is applied to the vehicle, the electric machine generates electric energy which may be stored and/or utilised directly. The stored electric energy may later be utilized for driving the vehicle, for example.

The utilization of a conventional clutch mechanism to connect the input shaft of the gearbox with the combustion engine upon take-off of the vehicle and to disconnect them during a gear changing process in the gearbox involves disadvantages, such as heating of the discs of the clutch mechanism, which results in increased fuel consumption and wear of the clutch discs. This is particularly relevant upon connection of the shafts. Furthermore, a conventional clutch mechanism is relatively heavy and costly. It also occupies a relatively large space in the vehicle. Friction losses also occur upon use of a hydraulic converter/torque transformer of the type commonly used in automatic gearboxes.

The conventional clutch mechanism as well as the hydraulic converter and said disadvantages associated therewith may be avoided by providing the vehicle with a propulsion system in which the output shaft of the combustion engine, the rotor of the electric machine and the input shaft of the gearbox are interconnected by a planetary gear. A vehicle having a propulsion system of this type is known through EP 1 319 546. There is, of course, an ongoing attempt to improve the way to drive a vehicle having such a propulsion system with respect to energy efficiency and the way that the electric machine and the combustion engine interact.

SUMMARY OF THE INVENTION

The object of the present invention is to provide a method of the sort initially defined considering the attempt mentioned above.

According to the invention, the combustion engine of a vehicle with a propulsion system of the above-mentioned type, and which further comprises a component brake designed to, when necessary, brake the rotation of the first component of the planetary gear, is started when the vehicle is in an appropriate initial state. In such a state, the vehicle is driven forward by the electric machine while a reverse gear is engaged in the gearbox, such that the electric machine drives the third component of the planetary gear to rotate with a negative rotational speed while the component brake brakes the first component, which is connected to the output shaft of the combustion engine. When the component brake is transferred to its open position, the output shaft of the combustion engine is, via the planetary gear, rotated with a positive rotational speed, and the combustion engine may be started.

The method according to the invention exploits the fact that the electric machine, in contrast to the combustion engine, can rotate with both positive and negative rotational speeds. It is therefore possible to, by means of the electric machine, drive the vehicle forward with a reverse gear engaged in the gearbox. This means that the start of the combustion engine can take place during ongoing acceleration, since the torque of the electric machine is simultaneously used to drive the vehicle and to accelerate the combustion engine. The method is particularly suitable for buses in urban traffic, where it is desirable that the bus after stopping at a bus stop, moves off silently. The bus may in those cases move off by means of the electric machine and the combustion engine is started during ongoing acceleration.

The design of the propulsion system with a single electric machine and a single planetary gear which connects the electric machine, the combustion engine and the gear box simplifies the control of the components of the propulsion system in comparison with so-called power split propulsion systems, or series-parallel propulsion systems, in which two electric machines are used. The inventive method is thereby less complicated to implement compared to methods for starting a combustion engine in such propulsion systems.

According to one embodiment of the invention, step (a) is preceded by the step:
(a1) checking that the present torque of the electric machine is sufficient to provide a resulting torque on the output shaft of the combustion engine, sufficient to start the combustion engine.

According to an alternative of this embodiment, step (a) is, in the case where the check in step (a1) shows that the present torque of the electric machine at the moment is insufficient, carried out with the drive wheels of the vehicle partly braked and while increasing the torque of the electric machine towards a value which provides a sufficient resulting torque acting on the output shaft of the combustion engine to start the combustion engine. This embodiment has the advantage that the method can be used to start the combustion engine of a vehicle when the driver wishes to drive the vehicle at a very low velocity. The combustion engine of the vehicle can, thanks to the braking of the drive wheels, be started without affecting the velocity of the vehicle.

According to one embodiment of the invention, step (a) is followed by the steps:

(b) controlling the electric machine and/or the combustion engine so that a state of a zero torque is reached in the gearbox, (c) disengaging the reverse gear engaged in the gearbox, (d) controlling the electric machine and/or the combustion engine so that the rotational speed of the ring gear together with the rotational speed of the output shaft of the combustion engine give the input shaft of the gearbox a rotational speed which for the current velocity of the vehicle is synchronized with the shaft rotational speed for a desired forward gear in the gearbox, and (e) engaging the desired forward gear in the gearbox.

By means of these steps, a state is reached in which the vehicle can be continuedly driven forward by the combustion engine and the electric machine, in combination, using a desired forward gear.

According to a further embodiment of the invention, step (e) is followed by the steps:

(f) checking demanded driving torque, (g) controlling the torque of the electric machine to provide a level which gives the demanded driving torque while simultaneously controlling the rotational speed of the combustion engine to provide a value which gives the components in the planetary gear the same rotational speed, (h) transferring the locking means to the locking position when said components rotate with the same rotational speed.

According to this embodiment, a state in which the vehicle can be driven with the planetary gear locked is reached, so that the power transmission between, on the one hand, the combustion engine and the electric machine and, on the other hand, the drive wheels of the vehicle becomes efficient.

According to one embodiment of the invention, the method is carried out for a propulsion system wherein said first component of the planetary gear is the sun gear, said second component of the planetary gear is the planet wheel carrier and said third component of the planetary gear is the ring gear. Such a propulsion system is previously disclosed in the still unpublished SE 1051384-4. By connecting the electric machine to the ring gear and the output shaft of the combustion engine to the sun gear, a compact construction is achieved, which is easy to fit into already existing spaces for propulsion systems having clutch mechanisms instead of planetary gears. Thereby, a hybridized gearbox may be made size and weight compatible with a standard gearbox and standardized interfaces may be maintained. This means that the weight increase normally associated with hybridization may be reduced considerably. Another advantage is that a connection of the electric machine to the ring gear gives a higher possible brake torque associated with the electric machine than if it had been connected to the sun gear.

According to a further embodiment of the invention, the method is carried out for a vehicle with a propulsion system which comprises a range gear and according to a further development of this embodiment, the method is carried out with said reverse gear in combination with a high range gear. The utilisation of this gear combination is normally not used in vehicles of this kind and enables carrying out the inventive method at a considerably higher velocity and during a more lengthy acceleration than when the low range gear is engaged. It is however entirely possible to carry out the inventive method with the low range gear engaged where the velocity of the vehicle is sufficiently low at the time when a wish to start the combustion engine arises.

According to one embodiment of the invention, the method is carried out for a propulsion system wherein the output shaft of the combustion engine is connected to the sun gear at a fixed transmission ratio, and/or wherein the input shaft of the gearbox is connected to the planet wheel carrier at a fixed transmission ratio.

According to one embodiment of the invention, the method is carried out for a propulsion system wherein the output shaft of the combustion engine is connected to said first component so that they rotate as a unit with the same rotational speed and/or wherein the input shaft of the gearbox is connected to the planet wheel carrier so that they rotate as a unit with the same rotational speed.

According to one embodiment of the invention, the method is carried out for a propulsion system wherein the locking means, in the locking position, connects the sun gear to the planet wheel carrier.

The invention also relates to a computer program in a computer program product having the features disclosed herein, an electronic control unit having the features disclosed herein and a vehicle having the features disclosed herein.

Other advantageous features and advantages of the invention will appear from the description following below.

BRIEF DESCRIPTION OF THE DRAWINGS

The invention will in the following be further described by means of example with reference to the appended drawings, wherein.

DETAILED DESCRIPTION OF EMBODIMENTS OF THE INVENTION

Figure 1:
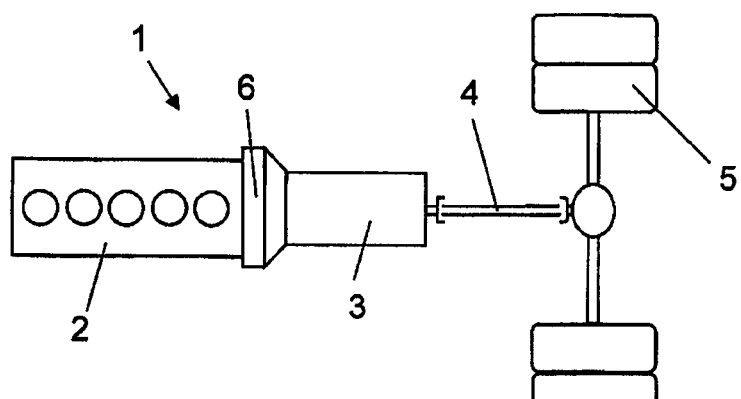
FIG. 1 is a schematic drawing of a propulsion system of a vehicle for which a method according to the invention may be carried out.

FIG. 1 shows a propulsion system 1 for a heavy vehicle. The propulsion system comprises a combustion engine 2, a gearbox 3, a number of drive shafts 4 and drive wheels 5. Between the combustion engine 2 and the gearbox 3 the propulsion system 1 comprises an intermediate portion 6.

Figure 2:
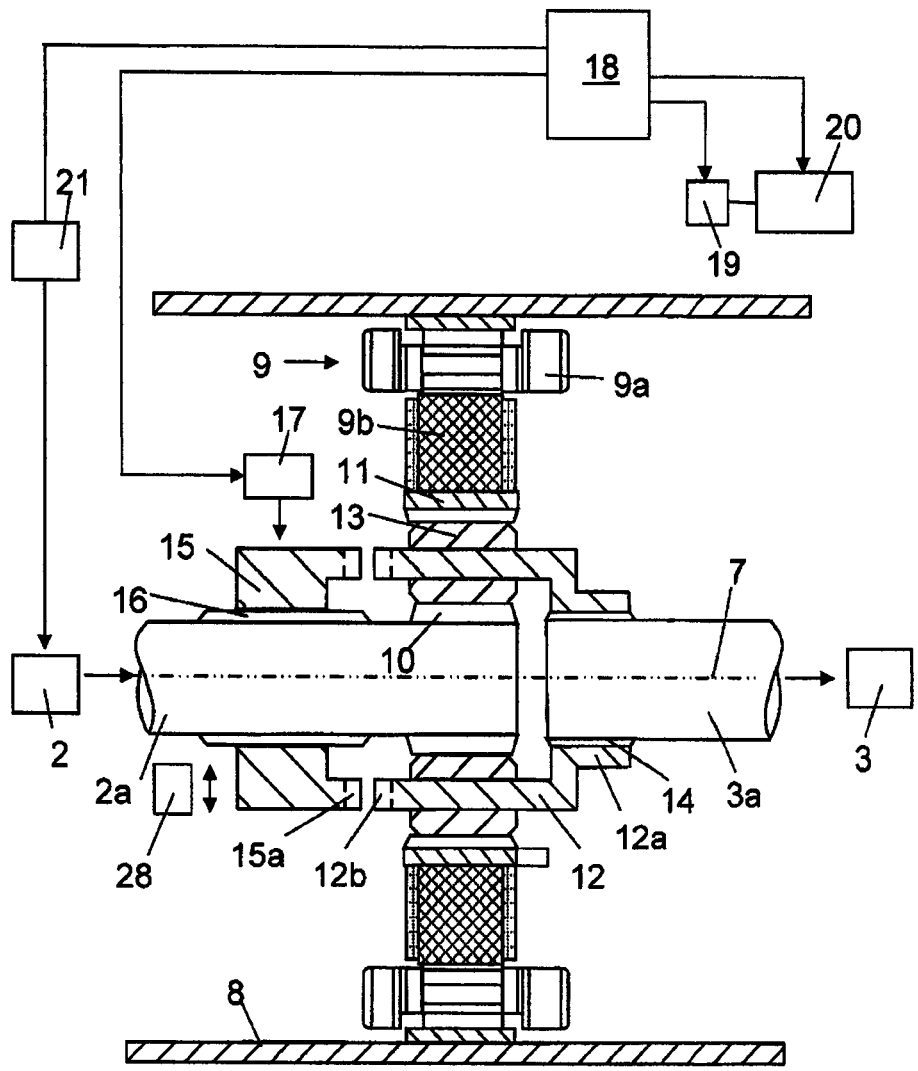
FIG. 2 is a simplified view of a part of a propulsion system.

FIG. 2 shows a more detailed view of the components in the intermediate portion 6. The combustion engine 2 is provided with an output shaft 2a and the gear box 3 with an input shaft 3a in the intermediate portion 6. The output shaft 2a of the combustion engine is coaxially arranged with respect to the input shaft 3a of the gear box. The output shaft 2a of the combustion engine and the input shaft 3a of the gear box are arranged to rotate around a common rotation axis 7. The intermediate portion 6 comprises a housing 8 enclosing an electric machine 9 and a planetary gear. The electric machine 9 comprises as usual, a stator 9a and a rotor 9b. The stator 9a comprises a stator core secured in a suitable way on the inside of the housing 8. The stator core comprises the windings of the stator. The electric machine 9 is adapted to, in certain operation situations, utilize stored electric energy for supplying propelling force to the input shaft 3a of the gearbox and, in other operation situations, utilize kinetic energy of the input shaft 3a of the gear box to extract and store electric energy.

The planetary gear is arranged essentially radially internally of the stator 9a and the rotor 9b of the electric machine. The planetary gear comprises as usual, a first component, a second component and a third component. The first component is, in this embodiment, a sun gear 10, the second component is a planet wheel carrier 12, and the third component is a ring gear 11. The planet wheel carrier 12 carries a number of gear wheels 13 rotatably arranged in a radial space between the teeth of the sun gear 10 and the ring gear 11. The sun gear 10, is in this embodiment, secured to a circumferential surface of the output shaft 2a of the combustion engine. The sun gear 10 and the output shaft 2a of the combustion engine are here arranged to rotate as a unit with a first rotational speed $n_1$. The planet wheel carrier 12 comprises a fastening portion 12a, which in this embodiment, is fastened to a circumferential surface of the input shaft 3a of the gearbox by means of a splined connection 14. By means of this connection, the planet wheel carrier 12 and the input shaft 3a of the gearbox may rotate as a unit with a second rotational speed $n_2$. The ring gear 11 comprises an external circumferential surface onto which the rotor 9b in this embodiment is secured. The rotor 9b and the ring gear 11 here form a rotatable unit arranged to rotate with a third rotational speed $n_3$.

The propulsion system 1 comprises locking means for interlocking two of the components of the planetary gear. The locking means are, in this embodiment, arranged on the output shaft 2a of the combustion engine and on the planet wheel carrier 12 using a displaceable coupling member 15 provided on the output shaft 2a of the combustion engine, which coupling member 15, via a coupling portion 15a, is connectable to a coupling portion 12b of the planet wheel carrier 12. The coupling member 15 is fastened to the output shaft 2a of the combustion engine by a splined connection 16. The coupling member 15 is in this case fixed against rotation to the output shaft 2a of the combustion engine and displaceable in an axial direction on the output shaft 2a of the combustion engine. A schematically illustrated displacing member 17 is adapted to displace the coupling member 15 between a first position in which the coupling portions 15a, 12b are not mutually engaged, corresponding to a releasing position of the locking means, and a second position in which the coupling portions 15a, 12b are mutually engaged, corresponding to a locking position of the locking means. When the coupling portions 15a, 12b are mutually engaged, the output shaft 2a of the combustion engine and the input shaft 3a of the gearbox will be interlocked. These two shafts 2a, 3a and the rotor 9b of the electric machine will thereby rotate with the same rotational speed.

According to another embodiment of the invention, the inventive method is carried out for a propulsion system wherein the locking means comprise a casing provided with a first set of splines. In the releasing position, this first set of splines engages with a second set of splines provided on the second component of the planetary gear, which second component is connected to the input shaft of the gearbox. In the locking position, said first set of splines also engages with a third set of splines arranged on the first component of the planetary gear, which first component is connected to the output shaft of the combustion engine, so that said first and second components are interlocked. The casing may, for example, be a ring shaped casing, which encloses the planet wheel carrier in the case where the second component of the planetary gear consists thereof.

The locking means may, of course, also be arranged in other ways than mentioned above, for example, to interlock the ring gear and the output shaft of the combustion engine or the input shaft of the gearbox.

In the illustrated embodiment, an electric control unit 18 controls the displacing member 17. The control unit 18 also determines the occasions on which the electric machine 9 shall operate as a motor and on which occasions it shall operate as a generator. In order to make this decision, the control unit 18 may receive current information about suitable operating parameters. The control unit 18 may be a computer with suitable software for this task. The control unit 18 also controls, as schematically shown, regulating equipment 19, regulating the flow of electric energy between an energy storing means 20, such as a hybrid battery, and the stator 9a of the electric machine. On occasions upon which the electric machine operates as a motor, stored electric energy is supplied from the energy storing means 20 to the stator 9a and/or to other consumers. On occasions upon which the electric machine operates as a generator, electric energy is supplied from the stator 9a to the energy storing means 20. The energy storing means 20 delivers and stores electric energy with a voltage on the order of 200-800 Volts. Since the intermediate portion 6 between the combustion engine 2 and the gearbox 3 in a vehicle is restricted, it is required that the electric machine 9 and the planetary gear constitute a compact unit. The components 10-12 of the planetary gear are here arranged substantially radially internally of the stator 9a of the electric machine. The rotor 9b of the electric machine, the ring gear 11 of the planetary gear, the output shaft 2a of the combustion engine and the input shaft 3a of the gearbox are arranged to rotate around a common axis of rotation 7. Through such a design, the electric machine 9 and the planetary gear occupies a comparatively small space. The vehicle is provided with a motor control function 21 through which the rotational speed $n_1$ of the combustion engine may be regulated. The control unit 18 may activate the motor control function 21 upon engagement and disengagement of gears in the gearbox 3 in order to create a state of zero torque in the gearbox 3. The propulsion system may, of course, instead of being controlled by one single control unit 18, be controlled by several different control units.

The propulsion system 1 further comprises a component brake 28 which is transferable between a braking position and an open position. In the shown embodiment, the sun gear is, in the braking position, braked by the component brake 28 and is, in the open position, unaffected by the component brake 28 and may thereby rotate without hindrance therefrom. The component brake 28 can act directly or indirectly on the sun gear and may be, for example, an adjustable brake which may be torque controlled, a spring loaded brake with a fixed braking torque or a locking pin which may lock the fly wheel of the combustion engine. The component brake may be designed to act on the fly wheel of the combustion engine, on the output shaft of the combustion engine or directly on the sun gear of the planetary gear. The component brake 28 is suitably designed so that it can be controlled by means of the control unit 18.

Figure 3:
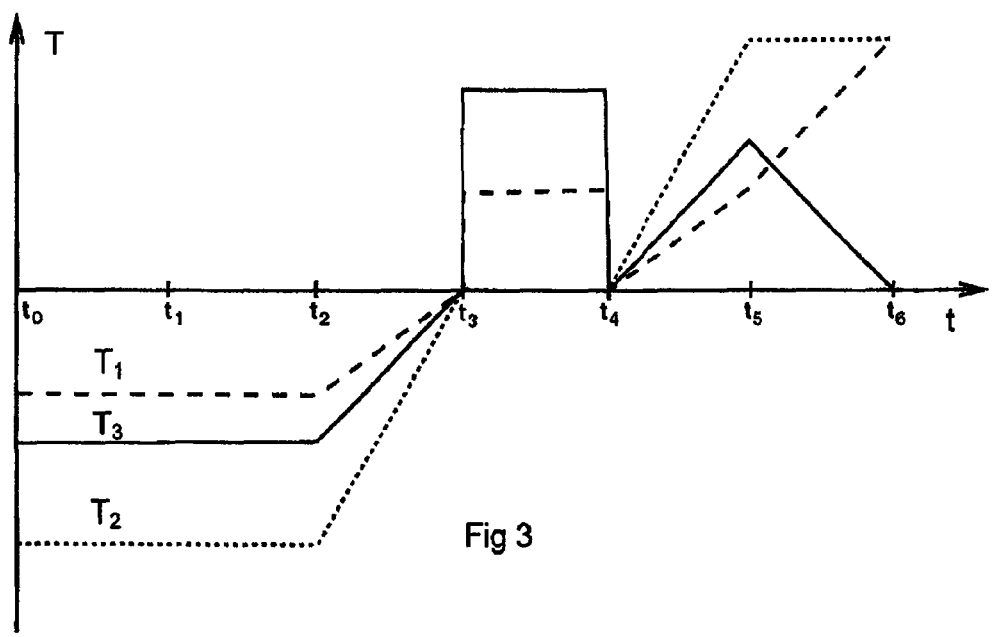
FIG. 3 shows how the torque of the different components in the propulsion system can vary over time when carrying out the method.
Figure 4:
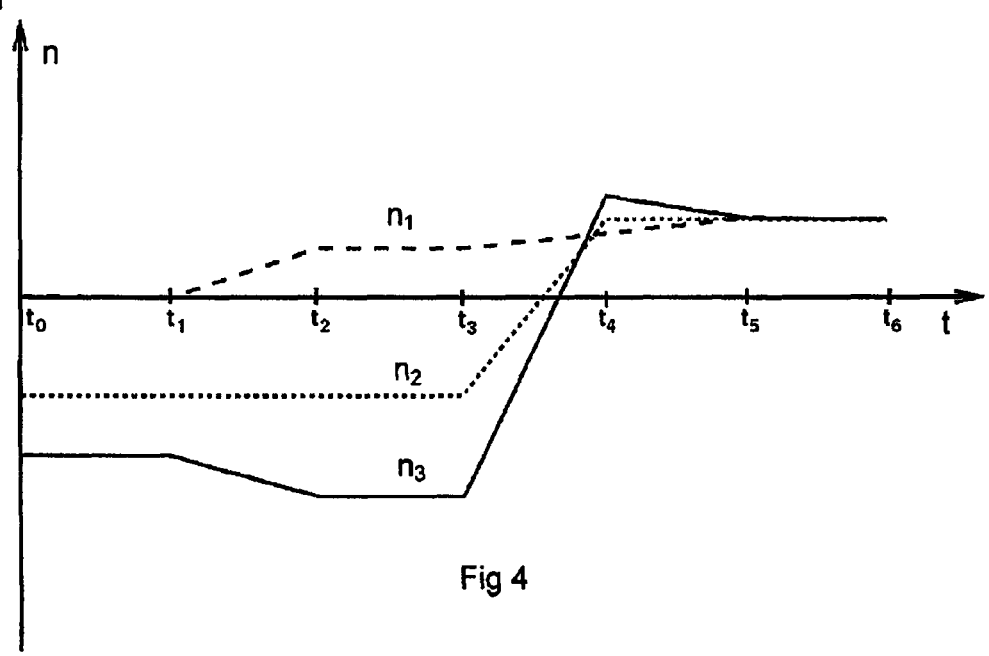
FIG. 4 shows how the rotational speed of the components in FIG. 3 can vary over time when carrying out the method.
Figure 6:
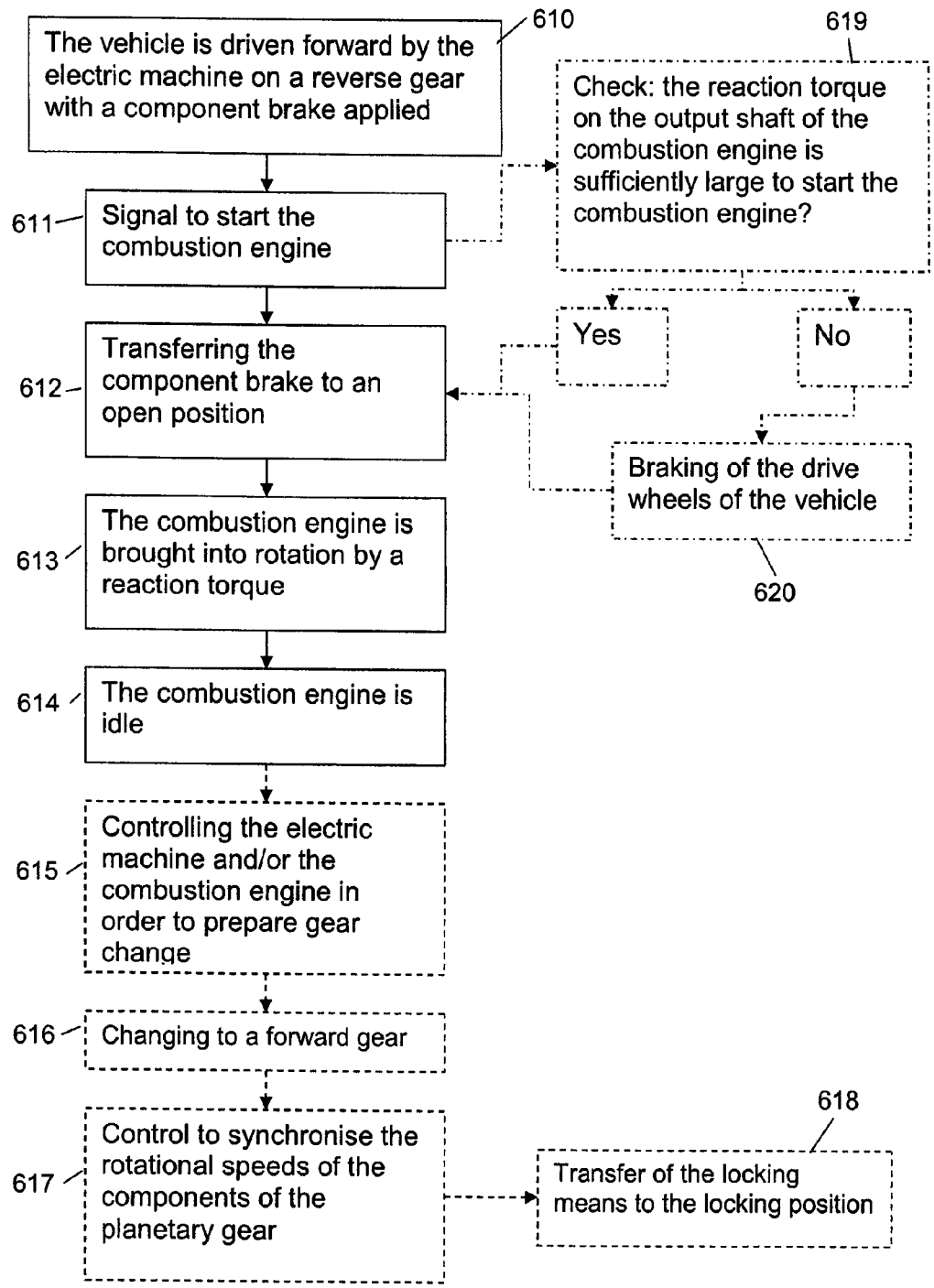
FIG. 6 is a flow chart illustrating a method according to the invention.

FIGS. 3 and 4 show how the torques $T_1$, $T_2$ and $T_3$ and the rotational speeds $n_1$, $n_2$ and $n_3$ for the output shaft 2a of the combustion engine (dashed line), the input shaft 3a of the gearbox (dotted line) and the rotor 9b of the electric machine (solid line), respectively, may vary over time t while carrying out an embodiment of the method according to the invention. By definition, the combustion engine 2, which rotates only in one direction, rotates with a positive rotational speed. Components rotating in the same direction as the combustion engine are defined to rotate with a positive rotational speed and components rotating in an opposite direction are defined to rotate with a negative rotational speed. In FIG. 6, a flow chart is shown which illustrates the method according to the embodiment shown in FIGS. 3 and 4 of the invention. The steps which are associated with the start of the combustion engine are, in FIG. 6, marked with solid lines, while steps following the start are marked with dashed lines. Other steps are marked with dash-dotted lines. In this embodiment of the method according to the invention, in the propulsion system 1, the rotor 9b of the electric machine is arranged to rotate as a unit with the ring gear 11, the output shaft 2a of the combustion engine is arranged to rotate as a unit with the sun gear 10 and the input shaft 3a of the gearbox is arranged to rotate as a unit with the planet wheel carrier 12 is used.

In order to start the combustion engine 2 by means of the method according to the invention, a vehicle with a propulsion system 1, as described above, is put in an appropriate initial state 610. An appropriate initial state is, in this case, a state wherein the vehicle is driven forward solely by the electric machine 9, which rotates with a negative rotational speed $n_3$. The locking means are in the releasing position so that the components of the planetary gear may rotate with different rotational speeds and the component brake 28 is in the braking position, so that the rotation of the sun gear 10 is hindered. Thereby, the torque $T_3$ of the electric machine via the ring gear 11 and the planet wheel carrier 12 causes a reaction torque $T_2$ on the input shaft 3a of the gearbox, which is therefore by the electric machine 9 brought to rotate with a negative rotational speed $n_2$. To be able to drive the vehicle forward, a reverse gear must, in the initial state, be engaged in the gearbox 3. In FIG. 3 and FIG. 4, the vehicle is driven forward in the initial state during the time $t=t_0-t_1$. In the shown embodiment, the vehicle is driven forward at a constant rotational speed, but the initial state may also be a state where the vehicle is accelerated. A reaction torque $T_1$ acts on the sun gear 5, and in this embodiment thereby on the output shaft 2a of the combustion engine. Since the component brake 28 is hindering the rotation of the sun gear 10, the output shaft 2a of the combustion engine remains however still.

In step 611, a signal to start the combustion engine 2 is given at the time $t=t_1$. The component brake 28 acting on the sun gear 10 is then, in step 612, by means of the control unit 18, transferred to the releasing position so that the sun gear 10 is allowed to rotate. The torque $T_3$ of the electric machine is kept constant. The reaction torque $T_1$ acting on the output shaft 2a of the combustion engine now, in step 613, gives rise to a rotation of said shaft 2a, since the sun gear 10 starts to rotate with a positive rotational speed $n_1$ in consequence of the rotation of the ring gear 11. The combustion engine 2 is thereby accelerated so that it may be started, and in step 614, reaches its idle rotational speed. Simultaneously, the input shaft 3a of the gearbox continues to rotate with a negative rotational speed $n_2$, so that the vehicle during the start of the combustion engine 2 is still driven forward by the electric machine 9.

In order to be able to drive the vehicle forward by means also of the combustion engine 2 the start thereof, shifting to a forward gear with a suitable transmission ratio must take place. In order to prepare for the shifting, the electric machine 9 is at the time $t=t_2$, in step 615, controlled by the control unit 18 so that the torque $T_2$ acting on the input shaft 3a of the gearbox goes towards zero. Simultaneously, the rotational speed of the combustion engine 2 is controlled so that the output shaft 2a, and thereby also the sun gear 10, is kept at a constant rotational speed $n_1$. At the time $t=t_3$ a state of a zero torque has been reached in the gearbox and the reverse gear is disengaged. In order to be able to engage an appropriate forward gear in step 616, the input shaft 3a of the gearbox must be driven at a rotational speed $n_2$ which, at the present conditions, corresponds to driving with said appropriate forward gear engaged. The electric machine 9 and the combustion engine 2 are therefore controlled so that they exert a positive torque $T_3$ and $T_1$ respectively on the ring gear 11 and on the sun gear 10, respectively, whereby the rotational speed $n_1$ of the sun gear increases and the ring gear 11 changes its direction of rotation and starts to rotate with a positive rotational speed $n_3$. At the time $t=t_4$, the resulting rotational speed $n_2$ of the input shaft 3a of the gearbox is synchronized with the rotational speed of a desired forward gear for the present conditions, and the gear is engaged.

It is now possible to continue the forward driving in different ways depending on the current circumstances. In most cases, it is most fuel efficient to continue driving with the locking means in the locking position, in which the ring gear 11, the sun gear 10 and the planet wheel carrier 12 rotate as a unit with the same rotational speed. This is also the embodiment shown in FIGS. 3 and 4. In order to be able to transfer the locking means to the locking position, the torque $T_3$ of the electric machine 9 is, in step 617, controlled towards a level which together with the torque $T_1$ of the combustion engine 2 gives a demanded driving torque. At the same time, the rotational speed of the combustion engine 2 is controlled in order to synchronize the components of the planetary gear so that these rotate with the same rotational speed. This state is reached at the time $t=t_5$. The locking means are, in step 618, transferred to the locking position, whereafter the torques of the combustion engine 2 and the electric machine 9 are controlled towards the distribution which, at the moment, is the most favorable for continued driving.

Under certain circumstances, it may be more favorable to continue driving with the locking means in the releasing position.

If the driver of the vehicle during the start of the combustion engine 2 does not demand sufficient driving torque, for example, if the driver wants to drive the vehicle at a very low velocity, the resulting torque on the output shaft 2a of the combustion engine may not be sufficiently high to be able to start the combustion engine. The method may include a step 619 wherein the control unit 18, before start of the combustion engine 2, checks whether the resulting torque reaches a threshold value, which is the smallest possible torque needed to start the combustion engine. If the resulting torque is insufficient, the propulsion system 1 may, in step 620, be controlled so that the drive wheels 5 of the vehicle during the start of the combustion engine 2 are braked, for example, using a service brake or a retarder. The torque of the electric machine may thus simultaneously be increased without affecting the velocity of the vehicle.

The method according to the invention is suitably carried out for a propulsion system with a range gear, wherein the reverse gear, which, in the initial state, is engaged in the gearbox, is used in combination with a high range gear. By using the high range gear, the vehicle can be driven at a velocity which, for a normal range gear ratio, is about four times as high as if the low range gear were engaged. If the method is carried out at a sufficiently low velocity, it is possible to use a low range gear instead.

Before initiating the inventive method, a check that the available torque of the electric machine is sufficiently high to start the combustion engine at the present rotational speed is preferably performed. If this is not the case, and the vehicle has already been accelerated up to a velocity which is too high, an alternative method for starting the combustion engine must be used.

However, a gear change must generally take place before the rotational speed has become so high that it is too late to start the combustion engine without slowing down, during which gear change it is suitable for the propulsion system to start the combustion engine and change to a forward gear.

As an alternative to the above mentioned embodiment, the method may be carried out for a propulsion system with the output shaft of the combustion engine connected to the ring gear and the rotor of the electric machine connected to the sun gear. It is also possible to connect the input shaft of the gearbox to either the ring gear or the sun gear. In these cases, as has been described above, the output shaft of the combustion engine, the input shaft of the gearbox and the rotor, respectively may, be connected to said first, second and third component respectively of the planetary gear, so that each rotate with the same rotational speed as the corresponding component, or at a fixed or at a variable transmission ratio. The component brake shall also, in these cases, act on the first component of the planetary gear, which first component is connected to the output shaft of the combustion engine.

Computer program code for implementing a method according to the invention is suitably included in a computer program which is readable into an internal memory of a computer, such as the internal memory of an electronic control unit of a motor vehicle. Such a computer program is suitably provided through a computer program product comprising a non-volatile data storing medium readable by an electronic control unit, which data storing medium has the computer program stored thereon. Said data storing medium is for example an optical data storing medium in the form of a CD-ROM-disc, a DVD-disc, or similar, a magnetic data storing medium in the form of a hard disc, a diskette, a tape or similar, or a Flash memory or a memory of the type ROM, PROM, EPROM or EEPROM.

Figure 5:
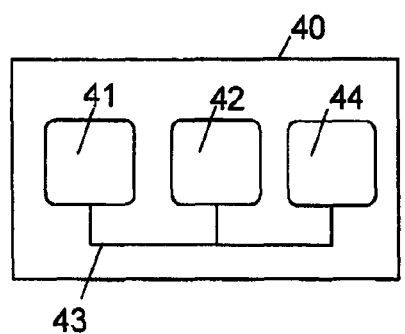
FIG. 5 is a schematic drawing of a control unit for implementing a method according to the invention.

FIG. 5 illustrates an exemplary schematic of an electronic control unit 40 including an execution means 41, such as a central processor unit (CPU), for executing a computer program. The execution means 41 communicates with a memory 42, for example of the type RAM, through a data bus 43. The control unit 40 includes also a non-volatile data storing medium 44, for example in the form of a Flash memory or a memory of the type ROM, PROM, EPROM or EEPROM. The execution means 41 communicates with the data storing medium 44 through a data bus 43. A computer program comprising computer program code for implementing a method according to the invention is stored on the data storing medium 44.

The invention is of course not in any way restricted to the embodiments described above, but many possibilities and modifications thereof would be apparent to a person with skill in the art without departing from the scope of the invention as defined in the appended claims.

The invention claimed is:

1. A method for driving a vehicle and starting a combustion engine in a propulsion system of the vehicle, wherein the propulsion system comprises:
    a combustion engine including an output shaft,
    an electric machine including a stator and a rotor,
    a gearbox including an input shaft,
    a planetary gear comprising three components including a sun gear, a ring gear and a planet wheel carrier,
    the output shaft of the combustion engine is directly connected and secured to a first of the three components of the planetary gear such that rotation of the output shaft of the combustion engine causes rotation of the first component, the input shaft of the gearbox connected to a third of the three components of the planetary gear such that rotation of the input shaft of the gearbox causes rotation of the third component and the rotor of the electric machine is connected to a second one of the three components of the planetary gear, such that rotation of the rotor causes rotation of the second component,
    locking means movable between a locking position in which two of the three components of the planetary gear are interlocked for causing the three components to rotate as a unit with a same rotational speed and a releasing position in which the three components are allowed to rotate with different respective rotational speeds, and
    a component brake being so located and being movable between a braking position in which the rotation of the first component of the planetary gear is braked by the component brake, and an open position in which rotation of the first component of the planetary gear is not affected by the component brake;
    the method comprising steps of:
    a) driving the vehicle forward using the electric machine by engaging a reverse gear in the gearbox while the electric machine drives the third component of the planetary gear to rotate with a negative rotational speed, with the locking means in the releasing position and with the component brake in the braking position, and
    b) moving the component brake to the open position, such that the output shaft of the combustion engine, via said the first component of the planetary gear, is rotated with a positive rotational speed, such that the combustion engine is in condition to be started.

2. The method according to claim 1, further comprising the step of:
    checking that a present torque of the electric machine is sufficient to provide a resulting torque on the output shaft of the combustion engine sufficient to start the combustion engine.

3. The method according to claim 2, further comprising braking drive wheels of the vehicle while controlling the torque of the electric machine toward a value which provides sufficient resulting torque acting on the output shaft of the combustion engine to start the combustion engine, when the present torque of the electric machine is insufficient.

4. The method according to claim 1, further comprising the steps of:
    (c) controlling the electric machine and/or the combustion engine so that a state of a zero torque is reached in the gearbox,
    (d) disengaging the reverse gear engaged in the gearbox,
    (e) controlling the electric machine and/or the combustion engine such that a rotational speed of the ring gear together with a rotational speed of the output shaft of the combustion engine gives the input shaft of the gearbox a rotational speed which for a current velocity of the vehicle, is synchronized with a shaft rotational speed corresponding to a desired forward gear in the gearbox, and (f) engaging the desired forward gear in the gearbox.

5. The method according to claim 4, further comprising the steps of:

(g) checking demanded driving torque, (h) controlling the torque of the electric machine towards a level that provides the demanded driving torque, (i) simultaneously controlling the rotational speed of the combustion engine towards a value that provides the three components of the planetary gear with the same rotational speed, and (j) moving the locking means to the locking position when said three components of the planetary gear rotate with the same rotational speed.

6. The method according to claim 1, wherein the first component of the planetary gear is the sun gear, the second component of the planetary gear is the planet wheel carrier and the third component of the planetary gear is the ring gear.

7. The method according to claim 1, wherein the propulsion system comprises a range gear.

8. The method according to claim 7, wherein said reverse gear is provided in combination with a high range gear.

9. A computer program product including a non-volatile and non-transitory data storing medium and a computer program comprising computer program code stored on the medium and readable by a computer, the code enabling a computer to implement a method according to claim 1 when the computer program code is executed in the computer.

10. An electronic control unit comprising an execution means, a memory connected to the execution means and a non-volatile and non-transitory data storing medium connected to the execution means, the computer program code of the computer program product according to claim 9 stored on the data storing medium.

11. A vehicle comprising an electronic control unit according to claim 10.

* * * * *